(12) United States Patent
Pagot

(10) Patent No.: US 7,673,617 B2
(45) Date of Patent: Mar. 9, 2010

(54) INDIRECT-INJECTION INTERNAL-COMBUSTION ENGINE, NOTABLY SPARK-IGNITION SUPERCHARGED ENGINE, WITH TWO INTAKE MEANS FOR CARRYING OUT A BURNT GAS SCAVENGING STAGE

(75) Inventor: Alexandre Pagot, Rueil Malmaison (FR)

(73) Assignee: Institut Francis du Petrole (FR)

( * ) Notice: Subject to any disclaimer, the term of this patent is extended or adjusted under 35 U.S.C. 154(b) by 201 days.

(21) Appl. No.: 11/762,881

(22) Filed: Jun. 14, 2007

(65) Prior Publication Data

US 2008/0308077 A1 Dec. 18, 2008

(51) Int. Cl.
*F02B 15/00* (2006.01)
*F02B 15/02* (2006.01)

(52) U.S. Cl. ..................... 123/432; 123/308

(58) Field of Classification Search ................ 123/432, 123/308, 306, 302, 90.15, 90.16, 90.17, 90.18, 123/90.1; 60/600
See application file for complete search history.

(56) References Cited

U.S. PATENT DOCUMENTS

| | | | | |
|---|---|---|---|---|
| 4,515,127 A | * | 5/1985 | Katsuoka | ..................... 123/430 |
| 4,523,560 A | * | 6/1985 | Motosugi et al. | ............. 123/308 |
| 4,732,124 A | * | 3/1988 | Nakamura et al. | ........... 123/302 |
| 5,060,616 A | * | 10/1991 | Nakagawa et al. | ........... 123/432 |
| 5,230,320 A | | 7/1993 | Hitomi et al. | |
| 5,553,580 A | * | 9/1996 | Ganoung | ..................... 123/308 |
| 6,397,813 B1 | | 6/2002 | Han et al. | |
| 6,860,252 B1 | * | 3/2005 | Ganoung | ..................... 123/308 |
| 6,895,912 B2 | * | 5/2005 | Saruwatari et al. | ........ 123/90.15 |
| 7,082,764 B2 | * | 8/2006 | Lecointe et al. | ................ 60/600 |
| 2006/0272623 A1 | * | 12/2006 | Pagot | ....................... 123/559.1 |
| 2007/0283694 A1 | * | 12/2007 | Leduc et al. | ................... 60/600 |

FOREIGN PATENT DOCUMENTS

FR 2 863 006 A1 3/2005

* cited by examiner

*Primary Examiner*—Mahmoud Gimie
(74) *Attorney, Agent, or Firm*—Antonelli, Terry, Stout & Kraus, LLP.

(57) ABSTRACT

The invention relates to an internal-combustion engine, notably an indirect-injection supercharged engine, that can run with a burnt gas scavenging stage, comprising at least a cylinder (10) including a combustion chamber (12), non-carbureted air intake passage (16) with an air intake valve (24), carbureted air intake passage (14) with a carbureted air intake valve (22), burnt gas exhaust passage (28) with an exhaust valve (32), an exhaust camshaft (36) for controlling the exhaust passage (28), an intake camshaft (44) for controlling the air intake passage (16) and the carbureted air intake passage (14).

10 Claims, 1 Drawing Sheet

INDIRECT-INJECTION INTERNAL-COMBUSTION ENGINE, NOTABLY SPARK-IGNITION SUPERCHARGED ENGINE, WITH TWO INTAKE MEANS FOR CARRYING OUT A BURNT GAS SCAVENGING STAGE

FIELD OF THE INVENTION

The present invention relates to an indirect-injection internal-combustion engine comprising at least two intake means for carrying out a residual burnt gas scavenging stage.

It more particularly relates to a supercharged engine, notably a spark-ignition engine.

BACKGROUND OF THE INVENTION

As it is well known, the power delivered by an internal-combustion engine depends on the amount of air fed into the combustion chamber of this engine, and this amount of air is itself proportional to the density of this air.

If high engine power is required, this amount of air is increased by compression of the air by means of a supercharging device (turbosupercharger or driven compressor such as a screw compressor) before it is fed into the combustion chamber.

In order to increase this amount of compressed air allowed to pass into the cylinder, a stage of scavenging the residual burnt gas present in the combustion chamber is provided. This scavenging stage allows, before the end of the engine exhaust cycle, to discharge the burnt gas present in the combustion chamber and to replace it by compressed (or supercharged) air.

As described in patent U.S. Pat. No. 4,217,866, this scavenging stage consists in carrying out, at the end of the exhaust cycle and at the start of the intake cycle of a cylinder, overlapping of the exhaust and intake valves of this cylinder. This overlap is obtained by opening simultaneously these exhaust and intake valves for some degrees to some ten degrees of crankshaft rotation angle.

In the indirect fuel injection supercharged engine example described in this document, a burnt gas exhaust means with an exhaust valve controlling an exhaust pipe and two intake means are provided. One of the intake means is a non-carbureted supercharged air intake means with a pipe and a valve, and the other intake means is a carbureted air intake means consisting of a pipe carrying a fuel injection nozzle and a valve.

Burnt gas scavenging is carried out, on the one hand, by overlap of the exhaust valve and of the non-carbureted supercharged air intake valve, the carbureted air intake valve remaining closed and, on the other hand, by the fact that the pressure of the air at the open intake valve is higher than the pressure of the exhaust gas still present in the combustion chamber The non-carbureted supercharged air that is allowed into the combustion chamber scavenges this gas and discharges it through the exhaust valve. Non-carbureted supercharged air therefore occupies the volume freed by this exhaust gas, which allows a significant increase in the amount of air introduced during the engine intake cycle. In the vicinity of the end of the scavenging stage, the exhaust valve closes, the carbureted supercharged air intake valve opens, the fuel injection nozzle is activated and carbureted supercharged air is fed into the combustion chamber through the other intake means as a complement to the non-carbureted supercharged air that is allowed therein.

Although this type of engine runs satisfactorily, it however involves drawbacks that are by no means insignificant.

In fact, during the burnt gas scavenging stage, it is necessary to use a single control means controlling the two intake valves, such as those known as VVT (Variable Valve Timing), which allow to vary the lift laws of these valves, in particular at their time of opening/closing.

A camshaft with actuating cams having each a very precise profile and with an angular shift in relation to one another, which allow to work with and without a scavenging stage, notably under engine idle speed conditions, is provided.

Such a camshaft type is delicate to achieve and it requires many attempts to obtain the suitable profiles and angular shifts. Furthermore, it has a relatively great apparent spread.

Besides, outside the scavenging stage, the offset cams penalize running of the engine, notably its filling at high speeds. Furthermore, to obtain this cam shift, it is necessary to reach a compromise between the engine running mode with scavenging stage and the running mode without scavenging stage.

The present invention aims to overcome the aforementioned drawbacks by means of an engine with devices allowing the valves to be actuated without requiring complex and expensive control means.

SUMMARY OF THE INVENTION

The present invention thus relates to an internal-combustion engine, notably an indirect-injection supercharged engine, that can run with a burnt gas scavenging stage, comprising at least a cylinder including a combustion chamber, air intake means with an air intake valve, carbureted air intake means with a carbureted air intake valve, burnt gas exhaust means with an exhaust valve and means for controlling the exhaust means, characterized in that the engine comprises control means for the air intake means and additional control means for the carbureted air intake means.

The additional control means can comprise carbureted air intake valve actuating means controlled by the means controlling the exhaust means.

The actuating means can include a valve lever actuating the carbureted air intake valve.

The means controlling the exhaust means can comprise an actuator for the valve lever.

The means controlling the exhaust means can comprise a camshaft and the camshaft can comprise a cam that can control the motion of the valve lever.

The camshaft can comprise a cam that can control the exhaust valve.

The additional control means can comprise a camshaft.

The means controlling the air intake means can comprise means for varying the lift law of the air intake valve.

The internal-combustion engine can comprise a fuel injection nozzle for the air intake means allowing to obtain air intake means with controlled fuel injection.

The internal-combustion engine can also comprise a control unit allowing or preventing fuel injection into the controlled-injection air intake means.

BRIEF DESCRIPTION OF THE FIGURES

Other features and advantages of the invention will be clear from reading the description given hereafter by way of non limitative example, with reference to the accompanying drawings wherein.

DETAILED DESCRIPTION

Figure 1:
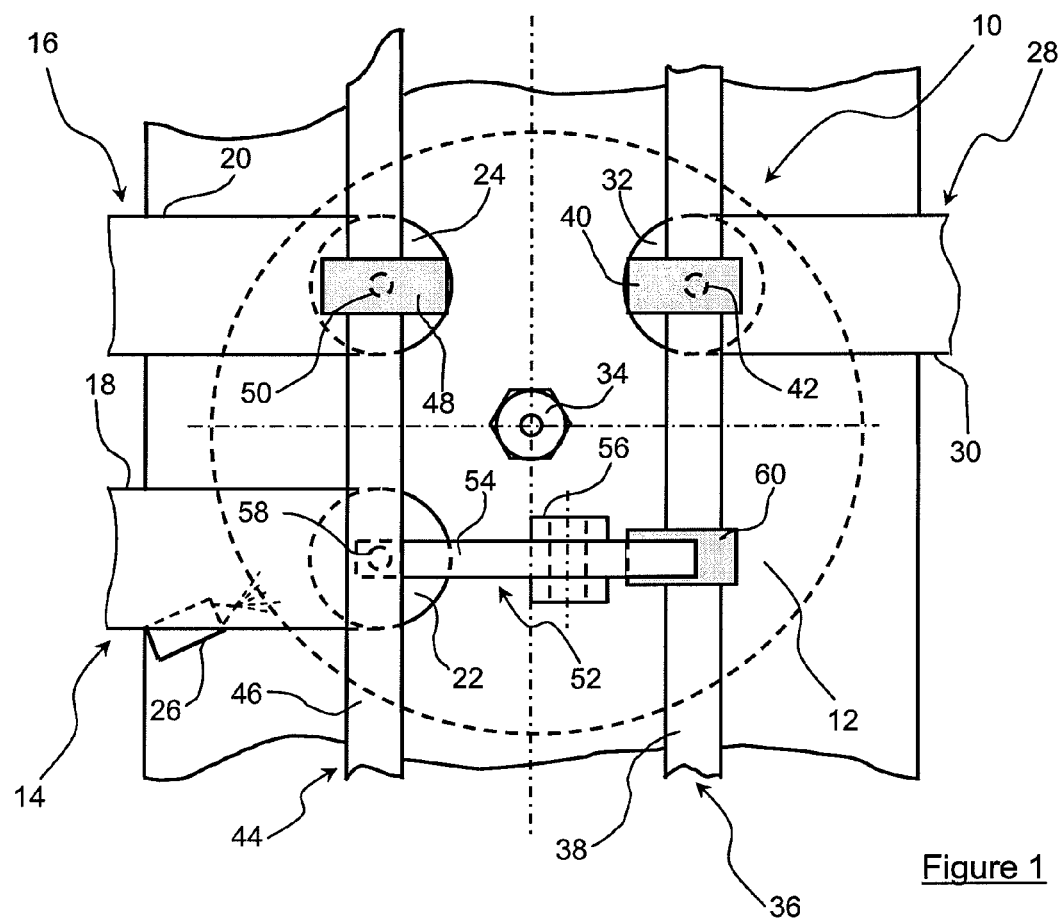
FIG. 1 shows a partial view of an internal-combustion supercharged engine according to the invention.

FIG. 1 shows a supercharged internal-combustion engine, notably of indirect fuel injection type, in particular a spark-ignition engine.

This engine comprises at least one cylinder 10 within which a piston (not shown) slides in a rectilinear reciprocating motion between a first position referred to as top dead center (PMH in the figure) and another position referred to as bottom dead center (PMB). This cylinder comprises a combustion chamber 12 in which combustion of a mixture of air or supercharged air and of fuel, or of supercharged (or non supercharged) air to which recirculated exhaust gas (EGR) has been added and of fuel occurs.

This cylinder 10 comprises carbureted supercharged air (or carbureted air) intake means 14 and supercharged air (or air) intake means 16, this air being, in the example shown, non-carbureted air.

Usually, these intake means consist of an orifice provided in the cylinder head this engine is generally equipped with, a pipe 18, 20 communicating with this orifice and a means 22, 24 for shutting off said orifice, such as an intake valve. A fuel injection means 26 such as a jet nappe nozzle allows the fuel to be fed into pipe 18 so that it mixes with the air circulating therein and forms a fuel mixture that is fed into the combustion chamber. Thus, carbureted air intake means 14 comprise pipe 18, valve 22 and injection nozzle 26, whereas non-carbureted air intake means 16 comprise pipe 20 and valve 24.

This cylinder also comprises burnt gas exhaust means 28 including an exhaust pipe 30 and a shut-off means such as an exhaust valve 32 for example.

The cylinder also comprises ignition means such as a spark plug 34 allowing to initiate combustion of the fuel mixture contained in combustion chamber 12.

Motion of exhaust valve 32 in order to provide opening/shut-off of the orifice provided in the cylinder head is controlled by a control means 36 comprising a rotary camshaft 38, referred to as exhaust camshaft, provided with a cam 40 acting upon rod 42 of exhaust valve 32.

Motion of non-carbureted air intake valve 24 in order to provide opening/shut-off of the orifice is controlled by means 44 allowing to vary its lift law, more particularly at its opening and closing times, more commonly referred to as VVT (Variable Valve Timing). Advantageously, these VVT type means essentially consist of a rotary camshaft 46, referred to as intake camshaft, with a cam 48 resting on rod 50 of intake valve 24.

Of course, these two camshafts can be driven synchronously by any known means such as the timing chain or belt any engine is fitted with.

Control of carbureted air intake valve 22 is provided by additional control means independent of intake camshaft 46.

These additional means can be a third camshaft synchronously driven with the intake camshaft and the exhaust camshaft by any known means, such as the aforementioned timing chain or belt.

Advantageously, as explained more in detail in the description hereafter, these additional control means comprise means 52 for actuating carbureted air intake valve 22 that are controlled by exhaust camshaft 38.

These actuating means include a valve lever 54 with a rod mounted rotating on a pivot 56 fastened to the engine and more particularly to the part of the cylinder head located between valve 22 and the exhaust camshaft. This lever 54 thus comprises two lever arms, one lever arm between the pivot and the end of this lever 54 that rests on rod 58 of valve 22 and another lever arm between this pivot and the other end that rests on a cam 60 carried by exhaust camshaft 38.

VVT type intake camshaft 46 is controlled by a control unit (not shown) such as the engine calculator any engine is usually equipped with. This engine calculator comprises mappings or charts allowing, depending on the running conditions of the engine, to carry out or not stages of scavenging residual burnt gas present in the combustion chamber, as well as fuel injection at predetermined times and for selected periods.

The profiles and the angular shifts of cams 40 and 60 carried by exhaust camshaft 38, as well as the various lever arms between the ends of lever 54 and pivot 56 are deduced by the man skilled in the art in such a way that air intake valve 22 starts opening in the vicinity of the closure of exhaust valve 32.

Thus, while running and in case of power variation required by the engine or in the running configuration of this engine where it is at low or medium speed and at high load, the engine is supplied with supercharged air and a burnt gas scavenging stage is carried out with valve overlap at the end of the exhaust cycle and at the beginning of the intake cycle of this engine.

Figure 2:
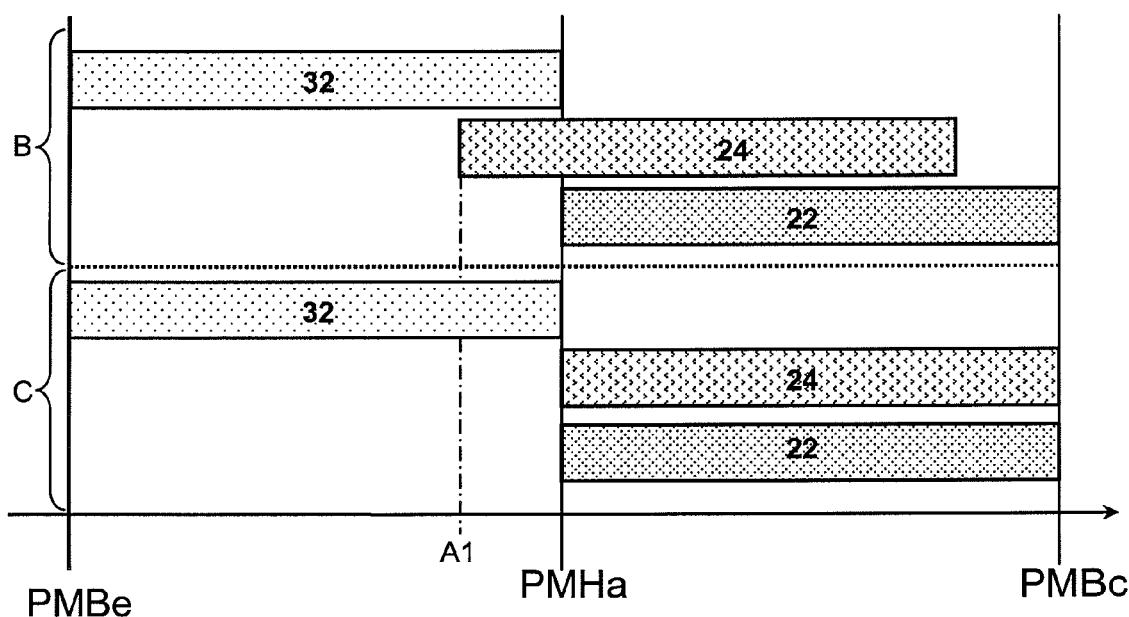
FIG. 2 is a graph showing the travel of the intake and exhaust valves when the engine runs under burnt gas scavenging conditions (B) and when the engine runs under conventional conditions (C).

In this case, in connection with FIG. 2 (part B), exhaust valve 32 opens conventionally in the vicinity of the exhaust bottom dead center (PMBe) and it closes in the vicinity of the intake top dead center (PMHa) under the action of cam 40 carried by exhaust camshaft 38. The engine calculator controls, in the vicinity of PMHa, VVT type camshaft 46 that controls non-carbureted air intake valve 24 in such a way that this valve opens early at a crank angle A1 located well before PMHa and closes before the compression bottom dead center (PMBc). Intake valve 22 of carbureted supercharged air intake means 14 opens in the vicinity of PMHa and it closes in the vicinity of PMBc under the action of cam 60 carried by exhaust camshaft 38.

Thus, between angle A1 and PMHa, the non-carbureted air intake 24 and exhaust 32 valves are open whereas carbureted air intake valve 22 is closed. In this configuration, the pressure of the non-carbureted supercharged intake air at the level of intake valve 24 is higher than the pressure of the residual exhaust gas present in the combustion chamber at the level of exhaust valve 32. A pressure differential thus occurs between the pressure of the supercharged air and the pressure of the residual exhaust gas. This differential allows scavenging of the burnt gas present in chamber 12 that is expelled, under the effect of this differential, from this chamber through exhaust valve 32.

This allows the residual burnt gas present in combustion chamber 12 to be scavenged and replaced by fuel-free supercharged air.

As soon as the burnt gas scavenging stage is complete in the vicinity of PMHa, exhaust valve 32 closes under the effect of cam 40, intake valve 24 remains open and carbureted supercharged air intake valve 22 opens under the action of lever 54 that swivels round pin 56 under the action of its end resting on cam 60. Simultaneously, the engine calculator controls activation of injection nozzle 26 so as to feed fuel into pipe 18 and to obtain a fuel mixture that is sent to combustion chamber 12. This fuel mixture is thereafter compressed, then ignited by plug 34 so as to reach combustion of this mixture, followed by expansion.

In order to improve the introduction of carbureted air in this combustion chamber, it is possible to inject fuel into intake pipe 18 early in relation to the cycle. This is done while intake valve 22 is still closed and before exhaust valve 32 closes. Thus, intake pipe 18 contains a fuel mixture prior to the opening of intake valve 22. This mixture is fed into the combustion chamber as this exhaust valve closes and the carbureted air intake valve opens.

In case of conventional engine running conditions, as it is the case at idle speed, the engine is supplied with air at ambient pressure and it requires no burnt gas scavenging stage.

In this configuration, intake camshaft 46 works like a conventional camshaft, without any early opening of air intake valve 24.

As illustrated by part C of FIG. 2, in the vicinity of PMHa, exhaust valve 32 closes, intake valves 22 and 24 open as the exhaust valve closes. As described above, the engine calculator controls activation of injection nozzle 26 so as to inject fuel into pipe 18 and to obtain a fuel mixture in combustion chamber 12.

Preferably, the fuel is injected into intake pipe 18 in such a proportion that it allows to obtain, in the combustion chamber, a fuel mixture with a fuel/air ratio close to 1.

The invention gives full latitude as regards the lift law and/or control of non-carbureted air intake valve 24, without penalizing the operation of carbureted air intake valve 22.

Thus, non-carbureted air intake valve 24 can close at the end of the burnt gas scavenging stage in the vicinity of PMHa. In this case, the engine will run like an engine with two valves 22 and 32 at the end of this scavenging stage.

Intake camshaft 46 can also be disengageable. This allows to make it inoperative during conventional engine running conditions, this engine also running like a conventional two-valve engine in this case.

The present invention is not limited to the example described and it encompasses any variant or equivalent.

Notably, the description above mentions non-carbureted air intake means that allow to feed a non-carbureted air into the combustion chamber during the scavenging stage.

It is possible to use specific intake means, referred to as controlled fuel injection intake means, allowing to introduce into the combustion chamber a supercharged air (or an air) that can be either a carbureted supercharged air (or a carbureted air), or a non-carbureted supercharged air. This is done by means of a fuel injection nozzle located in intake pipe 20 and controlled by the engine calculator so as to inject fuel into this pipe 20 outside the burnt gas scavenging stages, as described in detail in French patent application No. 05/05,237 filed by the applicant.

Thus, during the burnt gas scavenging stage, as described above, overlapping of the intake 24 and exhaust 32 valves is achieved. During this valve overlap, the engine calculator controls the injection nozzle of intake means 16 in such a way that it is not active. As soon as the burnt gas scavenging stage is complete, exhaust valve 32 is closed, intake valve 24 of controlled-injection intake means 16 remains open and intake valve 22 of carbureted air intake means 14 opens. Simultaneously, the engine calculator controls activation of nozzle 26 so that fuel is injected into pipe 18 and a fuel mixture is fed into combustion chamber 12.

In case of conventional engine running conditions, i.e. in intake mode without burnt gas scavenging, exhaust valve 32 closes, intake valve 22 of carbureted air intake means 14 and intake valve 24 of controlled-injection intake means 14 open as the exhaust valve closes. Simultaneously, the engine calculator controls activation of the two injection nozzles so as to inject fuel into pipes 18 and 20 and to obtain a fuel mixture in each pipe.

The invention claimed is:

1. An internal-combustion engine, notably an indirect-injection supercharged engine, that can run with a burnt gas scavenging stage, comprising at least a cylinder including a combustion chamber, air intake means with an air intake valve, carbureted air intake means with a carbureted air intake valve, burnt gas exhaust means with an exhaust valve and means for controlling the exhaust means, characterized in that the engine comprises control means for controlling the air intake means and additional control means for controlling the carbureted air intake means.

2. The internal-combustion engine as claimed in claim 1, characterized in that said additional control means comprise means for actuating carbureted air intake valve, controlled by means controlling exhaust means.

3. The internal-combustion engine as claimed in claim 2, characterized in that actuating means comprise a valve lever actuating the carbureted air intake valve.

4. The internal-combustion engine as claimed in claim 3, characterized in that means for controlling the exhaust means comprise an actuator- for the lever.

5. The internal-combustion engine as claimed in claim 3, characterized in that means for controlling the exhaust means comprise a camshaft and in that the camshaft comprises a cam- controlling the motion of lever.

6. The internal-combustion engine as claimed in claim 5, characterized in that camshaft comprises a cam controlling the exhaust valve.

7. The internal-combustion engine as claimed in claim 1, characterized in that said additional control means comprise a camshaft.

8. The internal-combustion engine as claimed in claim 1, characterized in that means for controlling the air intake means comprise means for varying the lift law of the air intake valve.

9. The internal-combustion engine as claimed in claim 1, characterized in that it comprises a fuel injection nozzle for the air intake means allowing to obtain controlled-injection air intake means.

10. The internal-combustion engine as claimed in claim 9, characterized in that it comprises a control unit allowing or preventing fuel injection into the controlled-injection air intake means.

* * * * *